(12) United States Patent
Min

(10) Patent No.: US 10,033,905 B2
(45) Date of Patent: Jul. 24, 2018

(54) INFORMATION PROCESSING SYSTEM, MANAGEMENT DEVICE, AND INFORMATION OUTPUT METHOD

(71) Applicant: Zhi Min, Tokyo (JP)

(72) Inventor: Zhi Min, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 147 days.

(21) Appl. No.: 15/122,682

(22) PCT Filed: Mar. 4, 2015

(86) PCT No.: PCT/JP2015/057075
§ 371 (c)(1),
(2) Date: Aug. 31, 2016

(87) PCT Pub. No.: WO2015/133650
PCT Pub. Date: Sep. 11, 2015

(65) Prior Publication Data
US 2017/0070638 A1    Mar. 9, 2017

(30) Foreign Application Priority Data

Mar. 6, 2014  (JP) ................................. 2014-043429
Feb. 25, 2015  (JP) ................................. 2015-035848

(51) Int. Cl.
G06F 3/12    (2006.01)
H04N 1/32    (2006.01)
(Continued)

(52) U.S. Cl.
CPC ....... *H04N 1/32272* (2013.01); *G06F 21/608* (2013.01); *H04N 1/00344* (2013.01);
(Continued)

(58) Field of Classification Search
None
See application file for complete search history.

(56) References Cited

U.S. PATENT DOCUMENTS 8,493,579 B2 * 7/2013 Tecu .................... G06F 3/1204
                                              358/1.13
8,711,407 B2 * 4/2014 Partridge ............. G06F 21/608
                                              358/1.14
(Continued)

FOREIGN PATENT DOCUMENTS

EP    2264587 A2    12/2010
JP    2001-290742    10/2001
JP    2007-249939     9/2007

OTHER PUBLICATIONS

International Search Report dated May 26, 2015 in PCT/JP2015/057075 filed Mar. 4, 2015.
Extended European Search Report dated Feb. 3, 2017.

*Primary Examiner* — Paul F Payer
(74) *Attorney, Agent, or Firm* — Harness, Dickey & Pierce, P.L.C.

(57) ABSTRACT

An information processing system includes a management device, a terminal device, and an electronic information output device. The management device includes a storage unit that stores electronic information for which registration is requested by the terminal device, in association with identification information, an issuing unit that issues an information-embedded pattern embedded with the identification information, a determining unit that determines whether the electronic information output device has privilege to output the electronic information, and a transmitting unit that transmits the electronic information to the electronic information output device when the electronic information output device is determined to have the privilege. The terminal device includes a re-generating unit that re- (Continued)

generates an information-embedded pattern to be distributed by adding privilege information chosen from candidates for privilege for defining a scope of the privilege to output the electronic information to the information included in the information-embedded pattern issued by the management device.

14 Claims, 10 Drawing Sheets

(51) Int. Cl.
  *G06F 21/60* (2013.01)
  *H04N 1/00* (2006.01)
(52) U.S. Cl.
  CPC ............... *H04N 2201/0039* (2013.01); *H04N 2201/0094* (2013.01)

(56) References Cited

U.S. PATENT DOCUMENTS

| | | | |
|---|---|---|---|
| 2004/0128501 | A1 | 7/2004 | Yamamoto et al. |
| 2005/0277405 | A1 | 12/2005 | Noguchi |
| 2006/0244995 | A1* | 11/2006 | Kushida ............... G06F 3/1207 358/1.15 |
| 2006/0264239 | A1 | 11/2006 | Tominaga |
| 2007/0019232 | A1 | 1/2007 | Kano |
| 2007/0195364 | A1 | 8/2007 | Umehara et al. |
| 2007/0283155 | A1 | 12/2007 | Kato |
| 2008/0043274 | A1* | 2/2008 | Wang .................... G06F 21/608 358/1.14 |
| 2010/0309505 | A1 | 12/2010 | Partridge et al. |
| 2011/0085196 | A1* | 4/2011 | Liu ....................... G06F 3/1204 358/1.15 |

* cited by examiner

FIG.6

| DOCUMENT ID | TWO-DIMENSIONAL CODE INFORMATION | DOCUMENT DATA STORAGE LOCATION | TENANT USER ID |
|---|---|---|---|
| 00001 | ABCD | \20xx0xxx\DOC00001.xxx | 001 |
| 00002 | EFGH | \20xx0xxx\DOC00002.xxx | 001 |
| 00003 | HIJK | \20xx0xxx\DOC00003.xxx | 001 |
| ⋮ | ⋮ | ⋮ | ⋮ |

FIG.7

| TENANT USER ID | 001 | | |
|---|---|---|---|
| OPTIONS / PRIVILEGING ITEMS | COUNTRY WITH PRIVILEGED | OFFICE WITH PRIVILEGED | DEPARTMENT |
| OPTIONS 1 | JAPAN | SAITAMA BRANCH | SALES DEPARTMENT |
| OPTIONS 2 | USA | TOKYO BRANCH | GENERAL AFFAIRS DEPARTMENT |
| OPTIONS 3 | UK | YOKOHAMA BRANCH | ACCOUNTING DEPARTMENT |
| ⋮ | ⋮ | ⋮ | ⋮ |

(A)

| TENANT USER ID | 001 | | | |
|---|---|---|---|---|
| DEVICE ID | COUNTRY WITH PRIVILEGED | OFFICE WITH PRIVILEGED | DEPARTMENT | REMARKS |
| MFP00001 | JAPAN | YOKOHAMA BRANCH | SALES DEPARTMENT | - |
| MFP00002 | JAPAN | YOKOHAMA BRANCH | GENERAL AFFAIRS DEPARTMENT | - |
| ⋮ | ⋮ | ⋮ | ⋮ | ⋮ |

(B)

| PRIVILEGING ITEMS | COUNTRY WITH PRIVILEGED | OFFICE WITH PRIVILEGED | DEPARTMENT |
|---|---|---|---|
| OPTIONS | JAPAN | SAITAMA BRANCH | SALES DEPARTMENT |

(C)

INFORMATION PROCESSING SYSTEM, MANAGEMENT DEVICE, AND INFORMATION OUTPUT METHOD

TECHNICAL FIELD

The present invention relates to an information processing system, a management device, and an information output method.

BACKGROUND ART

Conventionally known is a technology in which a tablet terminal is used to upload document data to a server on a network, and the document data is acquired over the network by operating a multifunction peripheral, and the multifunction peripheral is caused to output a printout of the document data.

In relation to use of a piece of document data, there are generally cases in which a user wishes to distribute document data to a plurality of users, and to allow the document data to be shared among the users. However, in a system such as that mentioned above, sometimes authentication information of the user who has uploaded the document data is required to acquire the document data over the network and to output a printout using a multifunction peripheral. The user who wishes to distribute the electronic document may therefore communicate his/her authentication information to the other users, or distribute the document data itself via an email.

Disclosed in Japanese Patent Application Laid-open No. 2001-290742 (Patent Document 1) to enable a mobile telephone to transmit electronic document data to a server, and to cause a designated output device to output the document is a configuration in which a piece of print data is transmitted to a server via an email of a mobile telephone of a user, and the designated output device is caused to output the designated document. Japanese Patent Application Laid-open No. 2007-249939 (Patent Document 2) discloses a technology allowing a user to receive a printout that is output by a printer by allowing the printer to receive authentication information from a user who is to attempting to acquire the printout, and by causing a printer management server to verify the received authentication information, and to allow the reserved printer to output a printout only if the verification is successful.

Such an approach of notifying the authentication information or distributing the document data itself, however, was insufficient from a viewpoint of security in applications in which a piece of document data is distributed to a plurality of users or shared among a plurality of users, because leakage of the authentication information or the document data may occur. It has been also considered problematic that any multifunction peripheral capable of receiving document data over a network can output the document data.

The technology disclosed in Patent Document 1 is intended to allow an email user who is a user of a mobile telephone not having a printing function to output a printout via a designated output device, and Patent Document 2, too, is not developed considering the applications for distributing and sharing document data to and among a plurality of users. Based on this background, development of a novel information processing system capable of distributing and sharing electronic information in a privileged manner has been waited for.

Therefore, there is a need to provide an information processing system, a management device, and an information output method, capable of distributing information for acquiring and outputting an electronic document to be distributed, in a manner allowing outputs of the electronic document to be made within a limited scope of privilege.

SUMMARY OF THE INVENTION

It is an object of the present invention to at least partially solve the problems in the conventional technology.

According to an embodiment, there is provided an information processing system that includes a management device; a terminal device; and an electronic information output device. The management device includes a storage unit configured to store electronic information for which registration is requested as electronic information to be distributed, the registration being requested by the terminal device, in association with identification information for identifying the electronic information; an issuing unit configured to issue an information-embedded pattern embedded with the identification information in a predefined format to the terminal device; a determining unit configured to determine whether the electronic information output device has privilege to output the electronic information, based on management information managed by the management device and information received from the electronic information output device requesting for the electronic information; and a transmitting unit configured to transmit the electronic information identified by the received information to the electronic information output device when the determining unit determines that the electronic information output device has the privilege. The terminal device includes a re-generating unit configured to re-generate an information-embedded pattern to be distributed by adding privilege information to information included in the information-embedded pattern issued by the management device, the privilege information being chosen from candidates for privilege for defining a scope of the privilege to output the electronic information, the candidates for privilege being shared between the terminal device and the management device. The electronic information output device includes a reader configured to read a presented information-embedded pattern; and a transmitting unit configured to transmit the information-embedded pattern read by the reader to the management device in response to a request for the electronic information.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 6 is a schematic illustrating a data structure of a document management table managed in the document management server according to the embodiment.

FIG. 7 is a schematic illustrating data structures of (A) a privilege table, (B) a device attribute table, and (C) privilege information used in the embodiment.

DESCRIPTION OF EMBODIMENTS

An embodiment of the prevent invention will now be explained. The embodiment of the present invention is however not limited to the embodiment described below. In the embodiment explained below, a printing processing system including a document management server, a mobile information terminal, and a multifunction peripheral is used as an example of an information processing system including a management device, a terminal device, and an electronic information output device.

Figure 1:
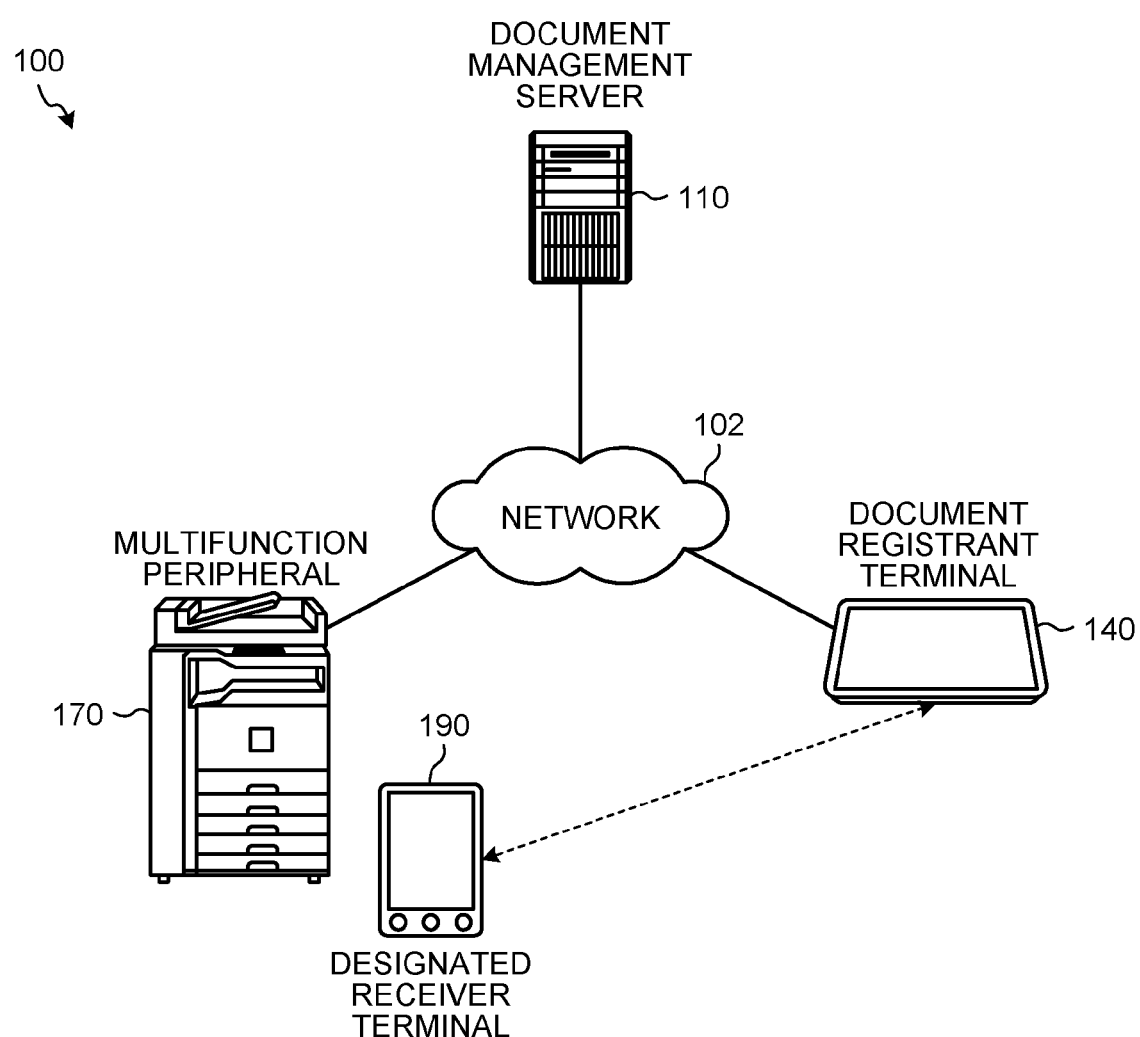
FIG. 1 is a schematic illustrating a network configuration of a printing processing system according to an embodiment of the present invention.

FIG. 1 is a schematic illustrating a network configuration of a printing processing system 100 according to the embodiment. As illustrated in FIG. 1, the printing processing system 100 includes a document management server 110, a document registrant terminal 140, and a multifunction peripheral 170 that are connected to a network 102. The network 102 may include a wired or wireless network, such as the Internet and a local area network (LAN), with no particular limitation.

Figure 9:
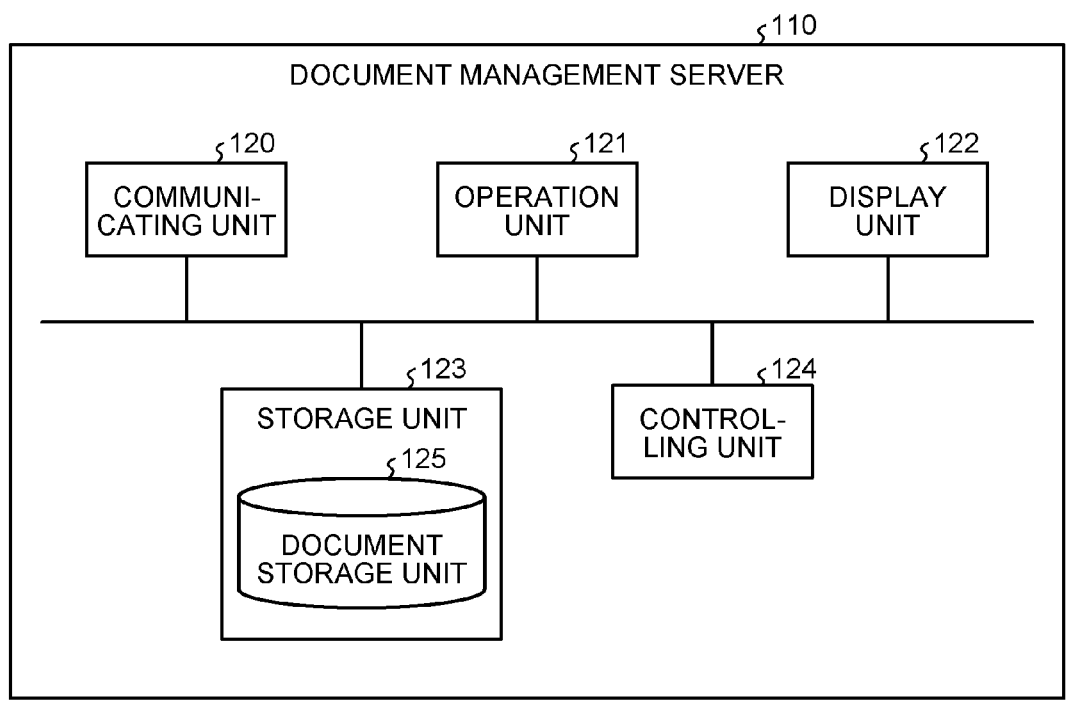
FIG. 9 is a block diagram illustrating an exemplary hardware configuration of the document management server according to the embodiment.

The document management server 110 manages document data for which registration is requested. The document management server 110 also determines, in response to a request for document data issued by the multifunction peripheral 170, whether the multifunction peripheral 170 has a privilege to output the document data, and transmits the requested document data to the multifunction peripheral 170 if so. The document management server 110 is configured as a general-purpose computer such as a desktop computer, a workstation, or a blade server, with no particular limitation. A hardware configuration of the document management server 110, which is illustrated in FIG. 9, will be explained later.

The document registrant terminal 140 is a mobile information terminal to be operated by a registrant who attempts to register a piece of document data to be distributed. The document registrant terminal 140 uploads a piece of retained document data to the document management server 110 in response to a user operation, and receives a two-dimensional code image issued in response to the uploading. The document registrant terminal 140 is typically configured as a mobile information terminal such as a tablet computer or a smart phone, but with no particular limitation, and may also be a desktop computer or a laptop computer.

Figure 10:
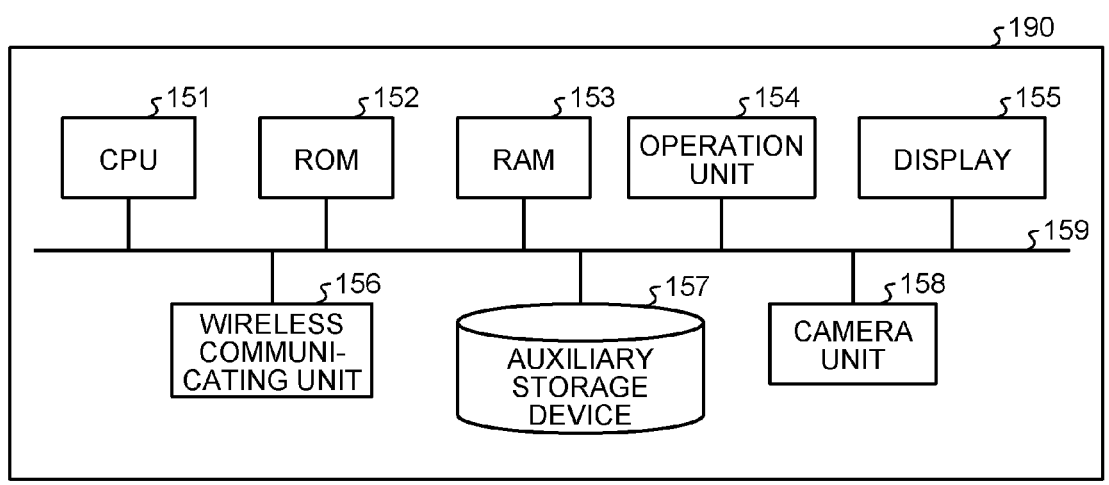
FIG. 10 is a schematic illustrating an exemplary hardware configuration of a designated receiver terminal according to the embodiment.

The issued two-dimensional code image or a re-generated two-dimensional code image, regenerated based on the issued two-dimensional code image in a manner described later, is transmitted to the document registrant terminal 140 of a designated receiver of the distribution, via a means such as an email. While explained in the embodiment is an example in which the two-dimensional code image is transmitted via an email, the way in which the two-dimensional code image is distributed is not particularly limited to an email. The document registrant terminal 140 has a function of displaying the distributed two-dimensional code image on the display, for example, and the user can present the received two-dimensional code image displayed on a designated receiver terminal 190 to the multifunction peripheral 170. Hereinafter, a mobile information terminal 140 of a designated receiver is referred to as a designated receiver terminal 190. A hardware configuration of the designated receiver terminal 190, which is illustrated in FIG. 10, will be explained later.

Figure 11:
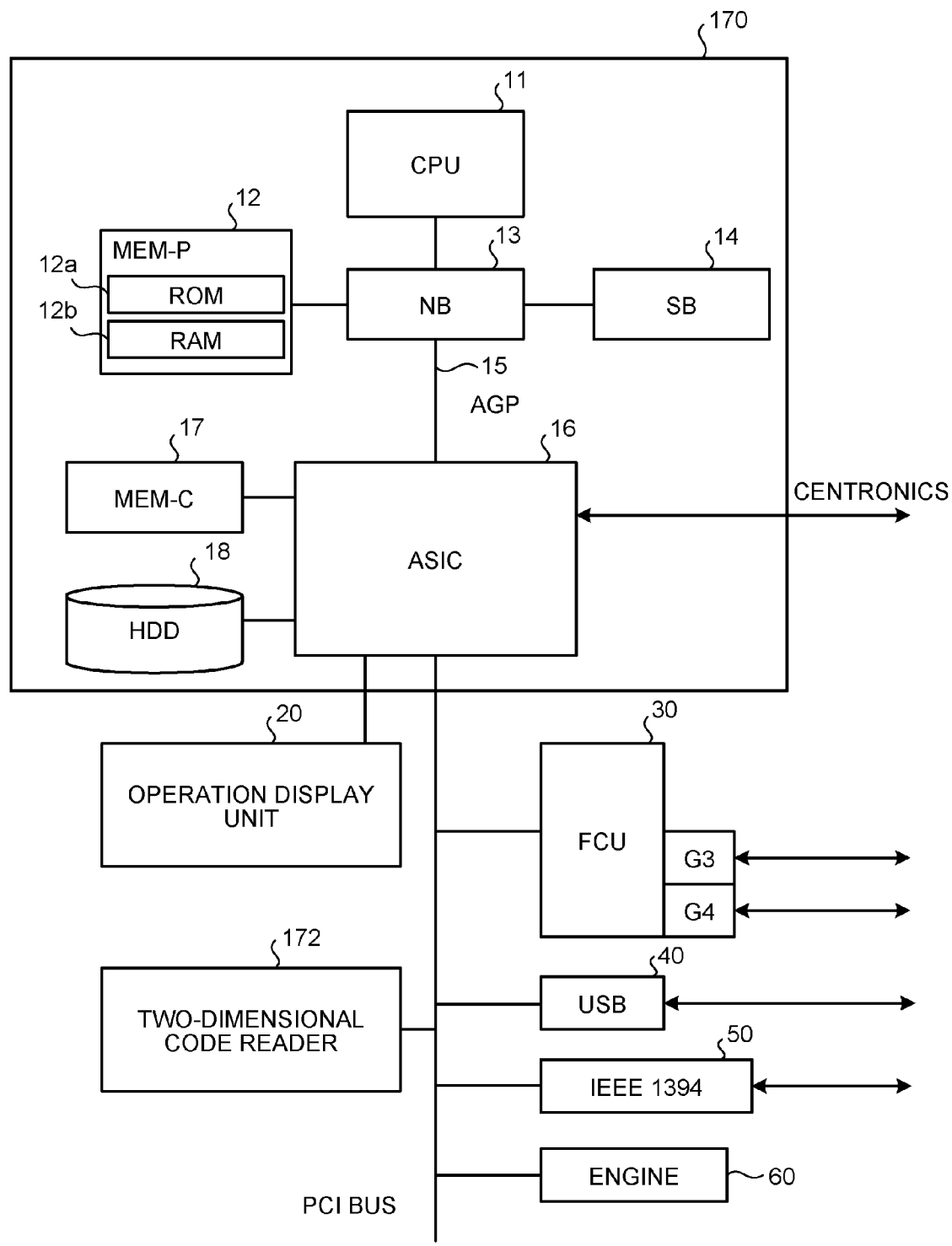
FIG. 11 is a block diagram illustrating a hardware configuration of the multifunction peripheral according to the embodiment.

The multifunction peripheral 170 is an image forming apparatus operated by a user who has received a distribution of the two-dimensional code image. The multifunction peripheral 170 receives presentation of a two-dimensional code image, presented by a user who is using the designated receiver terminal 190, and requests the piece of document data from the document management server 110. The multifunction peripheral 170 then receives the document data from the document management server 110, as a result of determining whether the multifunction peripheral 170 has a privilege to output the data, and outputs a printout. In the embodiment explained herein, the image forming apparatus operated by a user is explained as a multifunction peripheral 170 with a plurality of imaging functions such as those of a printer, a scanner, a copier, and a facsimile, but with no particular limitation. For example, the image forming apparatus may be an apparatus having one imaging function such as an inkjet printer or a laser printer. A hardware configuration of the multifunction peripheral 170, which is illustrated in FIG. 11, will be explained later.

Figure 2:
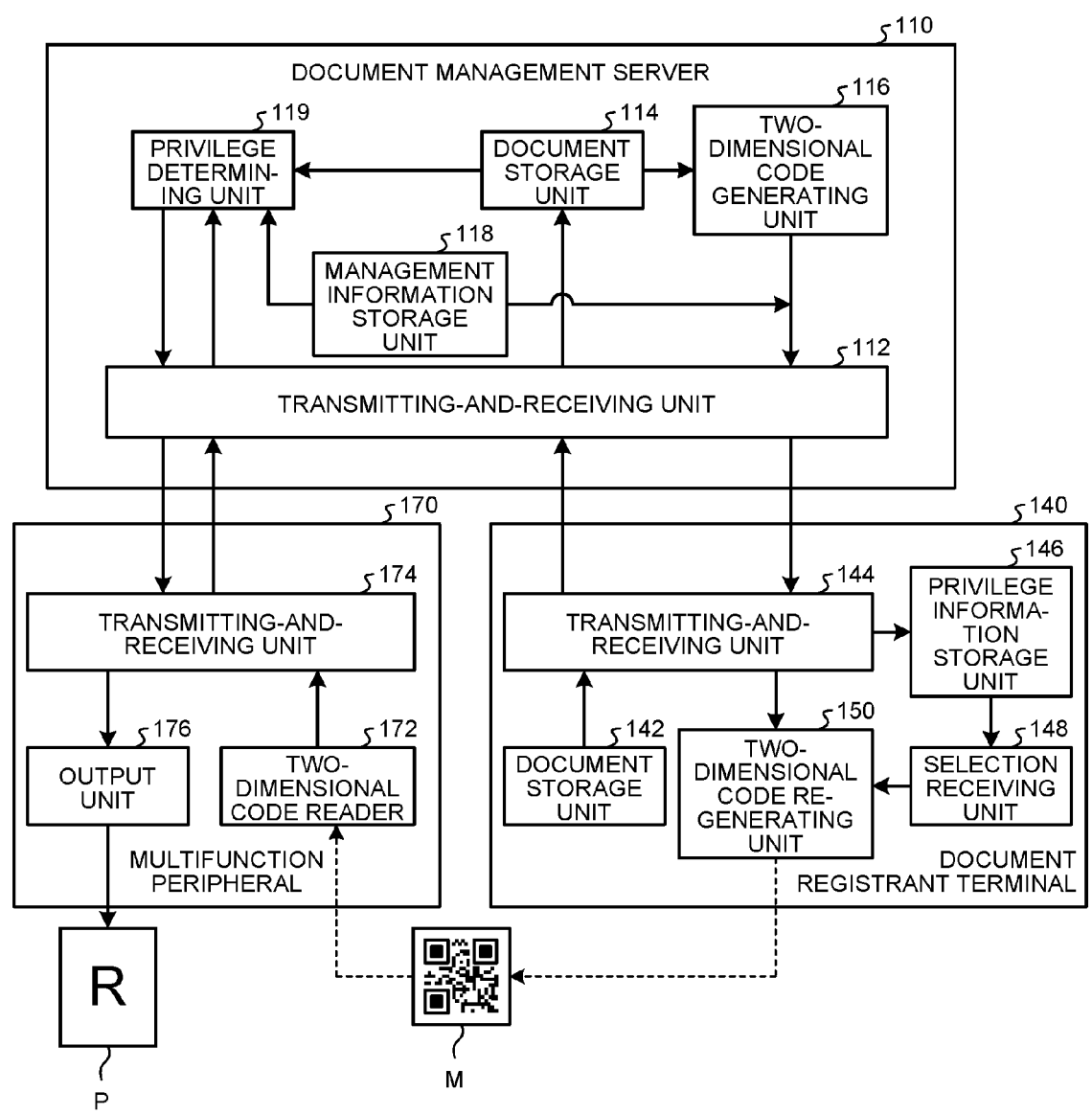
FIG. 2 is a functional block diagram of the printing processing system according to the embodiment.

FIG. 2 is a functional block diagram of the printing processing system 100 according to the embodiment. As illustrated in FIG. 2, the functional blocks of the printing processing system 100 are distributed to the document management server 110, the document registrant terminal 140, and the multifunction peripheral 170.

The functional blocks in the document management server 110 include a transmitting-and-receiving unit 112, a document storage unit 114, a two-dimensional code generating unit 116, a management information storage unit 118, and a privilege determining unit 119. The functional blocks in the document registrant terminal 140 include a document storage unit 142, a transmitting-and-receiving unit 144, a privilege information storage unit 146, a selection receiving unit 148, and a two-dimensional code re-generating unit 150. The functional blocks in the multifunction peripheral 170 include a two-dimensional code reader 172, a transmitting-and-receiving unit 174, and an output unit 176.

Figure 3:
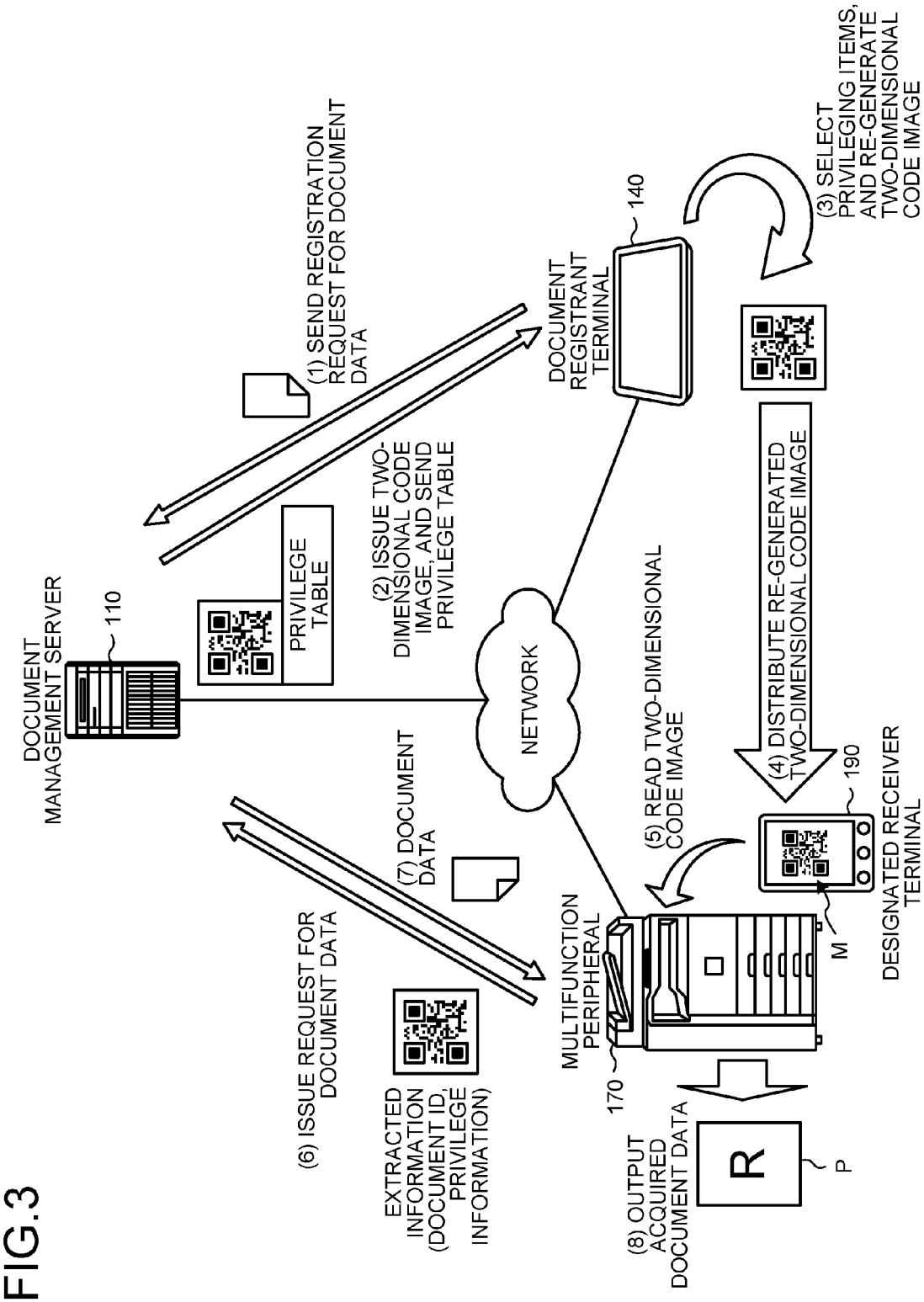
FIG. 3 is a schematic for explaining the entire process from a document data registration process to a printout outputting process in the printing processing system according to the embodiment.

FIG. 3 is a schematic for explaining the entire process from a document data registration process to a printout outputting process in the printing processing system 100 according to the embodiment. The entire process from the document data registration process to the printout outputting process is performed following the steps indicated as (1) to (8) in FIG. 3.

When a document registrant is to register a piece of document data, (1) the document registrant sends a request for registration of the document data to be distributed to the document management server 110, from the document registrant terminal 140. (2) The document registrant receives, as a response to the document registration request, a two-dimensional code image embedded with information for identifying the document data and issued by the document management server 110, and a privilege table on the document registrant terminal 140. The privilege table is a table including options for privileging items, such options enabling the document registrant to select privileges that define the scope of privilege for outputting the document data. For example, the privilege table contains one or more options that are candidates of "Department" where a multifunction peripheral to be granted with a privilege to output the document data is installed. In the embodiment explained herein, once a two-dimensional code image is issued, the privilege table is shared between the document management server 110 and the document registrant terminal 140, by causing the document management server 110 to transmit the privilege table. Alternatively, the privilege table may be distributed to the document registrant terminal 140 in advance.

(3) The document registrant then selects options for each of the privileging items that are to be enforced on the document, among those presented based on the privilege table, and re-generates a two-dimensional code image to be distributed, on the document registrant terminal 140. A user designates, for example, that only the multifunction peripheral installed in the "Sales Department" has the privilege to output a printout, from the candidates of the departments. (4) The document registrant then distributes the two-dimensional code image that is re-generated by the document registrant terminal 140 to the designated receiver terminal 190.

When the designated receiver is to output a printout of the document data, (5) the designated receiver displays the received re-generated two-dimensional code image M on the display of the designated receiver terminal 190, and allows the multifunction peripheral 170 to read the two-dimensional code image M. (6) This operation causes the multifunction peripheral 170 to issue a request for the document data from the document management server 110, based on the re-generated two-dimensional code image, and (7) the document data is transmitted from the document management server 110 to the multifunction peripheral 170 as a result of determining whether an output is permitted. Permissibility of the output is determined based on the privilege information included in the re-generated two-dimensional code image. For example, assuming that the document registrant designates that only the multifunction peripheral installed in the "Sales Department" is privileged to make the output, the request is accepted if the document management server 110 manages an attribute indicating that the multifunction peripheral 170 is installed in the "Sales Department". In this manner, (8) by merely allowing an appropriate multifunction peripheral 170 to read the distributed two-dimensional code image, the designated receiver can receive a printout P of the document data that is associated with the distributed two-dimensional code image.

Operations of the functional units in the document management server 110, the document registrant terminal 140, and the multifunction peripheral 170 in the document data registration process to the printout outputting process will now be explained with reference to FIG. 2.

The document data registration process will be explained to begin with. The transmitting-and-receiving unit 112 in the document management server 110 receives a registration request, together with a piece of document data to be distributed, from the document registrant terminal 140, and transmits the issued two-dimensional code image and the privilege table to the document registrant terminal 140 that is the requestor, as a response to the request. The document storage unit 114 stores therein the document data for which the registration is requested by the document registrant terminal 140, in association with a piece of document identification information for identifying the document data (hereinafter, referred to as a document ID). The document data is stored in a storage device such as a hard disk drive (HDD) or a solid state drive (SSD) provided to the document management server 110.

The two-dimensional code generating unit 116 generates a two-dimensional code image embedded with the document ID in a predefined format. The two-dimensional code image is not particularly limited, and may be a QR code (registered trademark). A QR code (registered trademark) includes a finder pattern, a timing pattern, and format information, and is generated in a predefined format. In the embodiment explained herein, a document ID is embedded in the two-dimensional code image, but, with no particular limitation to the document ID, any information allowing the document management server 110 to identify the document data may be embedded in the two-dimensional code image. For example, a digest value resulting from inputting a document ID to a hash function may be embedded in the two-dimensional code image.

The management information storage unit 118 manages the above-described privilege table for each tenant (user). For each of the tenants, the management information storage unit 118 also manages a list of electronic information output devices (including multifunction peripherals) managed by the corresponding user, and a device attribute table including the locations and the like of the respective electronic information output devices. A tenant herein means an organization that manages the privilege table and the device attribute table, and end users, who use the document registrant terminal 140 and the multifunction peripheral 170, belong to a tenant. A structure for managing a tenant is not particularly limited, and an upper-level tenant may include a lower-level tenant. The management information storage unit 118 also manages a user authentication table for performing user authentication for authenticating end users.

The privilege table and the device attribute table are prepared in advance. In a configuration in which the document management server 110 and the multifunction peripheral 170 are provided to a tenant, for example, the privilege table and the device attribute table are prepared when the tenant installs the document management server 110 and the multifunction peripheral 170. In a configuration in which the multifunction peripheral 170 is provided to a tenant, and the function of the document management server 110 is shared among a plurality of tenants as a service, the privilege table and the device attribute table are prepared in advance when the tenants sign a contract for using the service of the document management server 110. The user authentication table is also prepared in advance, and is updated as appropriate, based on a new user registration, a user deletion registration, and a user update registration to a tenant organization.

The transmitting-and-receiving unit 144 in the document registrant terminal 140 transmits a registration request for a piece of document data to be distributed to the document management server 110, and receives the issued two-dimensional code image and the privilege table from the document management server 110. The document storage unit 142 stores therein the document data to be distributed, and is provided as a storage area such as that in a RAM or a flash memory. The privilege information storage unit 146 stores therein the privilege table received from the document management server 110, and is provided as a storage area such as that in a RAM or a flash memory.

The selection receiving unit 148 presents one or more options for each of the privileging items included in the privilege table to the user, and receives a user designation from the presented options for the privileging items, such a designation to be enforced on the document data for which the registration is requested. The two-dimensional code re-generating unit 150 extracts information from the two-dimensional code issued by the document management server 110, adds the privilege information selected from the options for the privileging items to the extracted information, and re-generates a two-dimensional code image to be distributed. This two-dimensional code image to be distributed is the two-dimensional code image again embedded with these pieces of information in a predefined format, and the QR code (registered trademark) may also be used, in the same manner as in the document management server 110.

In the embodiment explained herein, the document registrant terminal 140 is explained to re-generate the two-dimensional code image to be distributed by adding the privilege information to the two-dimensional code image issued by the document management server 110. In the manner described above, the document registrant terminal 140 has a function of re-generating the two-dimensional code image to be distributed. Depending on the operation policy of the organization, however, the two-dimensional code image issued by the document management server 110 may be used as the two-dimensional code image to be distributed, without allowing the document registrant to add any privilege.

The document data printout outputting process will now be explained. The transmitting-and-receiving unit 112 in the document management server 110 receives the two-dimensional code image, or extracted information extracted from the two-dimensional code image presented to the multifunction peripheral 170, from the multifunction peripheral 170. In the explanation of the embodiment below, to reduce the computational load of the multifunction peripheral 170, the two-dimensional code image data is transmitted to the document management server 110 as it is, and the document management server 110 extracts the information from the two-dimensional code image data. In another embodiment, however, the multifunction peripheral 170 may extract the information from the two-dimensional code image, and only the extracted information may be transmitted to the document management server 110.

The privilege determining unit 119 determines whether the requestor multifunction peripheral 170 has the privilege to output the data, based on management information managed by the document management server 110 and the information received from the multifunction peripheral 170 having issued the request for the data. The output is not permitted if the privileging items have any options that are not defined as the candidates in the privilege table that is defined for the corresponding tenant, or if the privilege information embedded in the two-dimensional code image for the requestor multifunction peripheral 170 does not have any match in the device attribute table. If the privilege determining unit 119 determines that the requestor multifunction peripheral 170 has the privilege, the privilege determining unit 119 reads the document data identified by the received information from the document storage unit 114, and the transmitting-and-receiving unit 112 transmits the document data to the requestor multifunction peripheral 170.

In the multifunction peripheral 170, the transmitting-and-receiving unit 174 transmits the request for the document data to the document management server 110 based on the read two-dimensional code image, and receives a result of privilege determination and the document data transmitted from the document management server 110 as a result of the privilege determination. The two-dimensional code reader 172 reads the two-dimensional code image presented to the two-dimensional code reader 172, and extracts the information from the two-dimensional code image as appropriate. The two-dimensional code reader 172 includes a scanner that reads the two-dimensional code image as an image, or a two-dimensional code reader that optically reads the two-dimensional code, for example. The received document data has a format that can be processed by the multifunction peripheral 170. The output unit 176 controls the print engine to output a printout based on the document data received by the transmitting-and-receiving unit 174.

Each of the document management server 110, the document registrant terminal 140, and the multifunction peripheral 170 includes a central processing unit (CPU), and a random access memory (RAM), a read-only memory (ROM), a storage device such as an HDD or an SSD, and a network interface. The document management server 110 implements the functional units in the document management server 110 described above by causing the CPU to read a server program, and to load the server program onto the RAM. The document registrant terminal 140, too, implements the functional units in the document registrant terminal 140 described above by causing the CPU to read a client program, and to load the client program onto the RAM. The multifunction peripheral 170 implements the functional units in the multifunction peripheral 170 described above by causing the CPU to read the firmware of the multifunction peripheral 170 and an application program added as required, and to load the computer programs onto the RAM.

The document data registration process and the printout outputting process according to the embodiment will now be explained in more detail with reference to the flowcharts illustrated in FIGS. 4 and 5, the data structures illustrated in FIGS. 6 and 7, and the user interface screen illustrated in FIG. 8.

Figure 4:
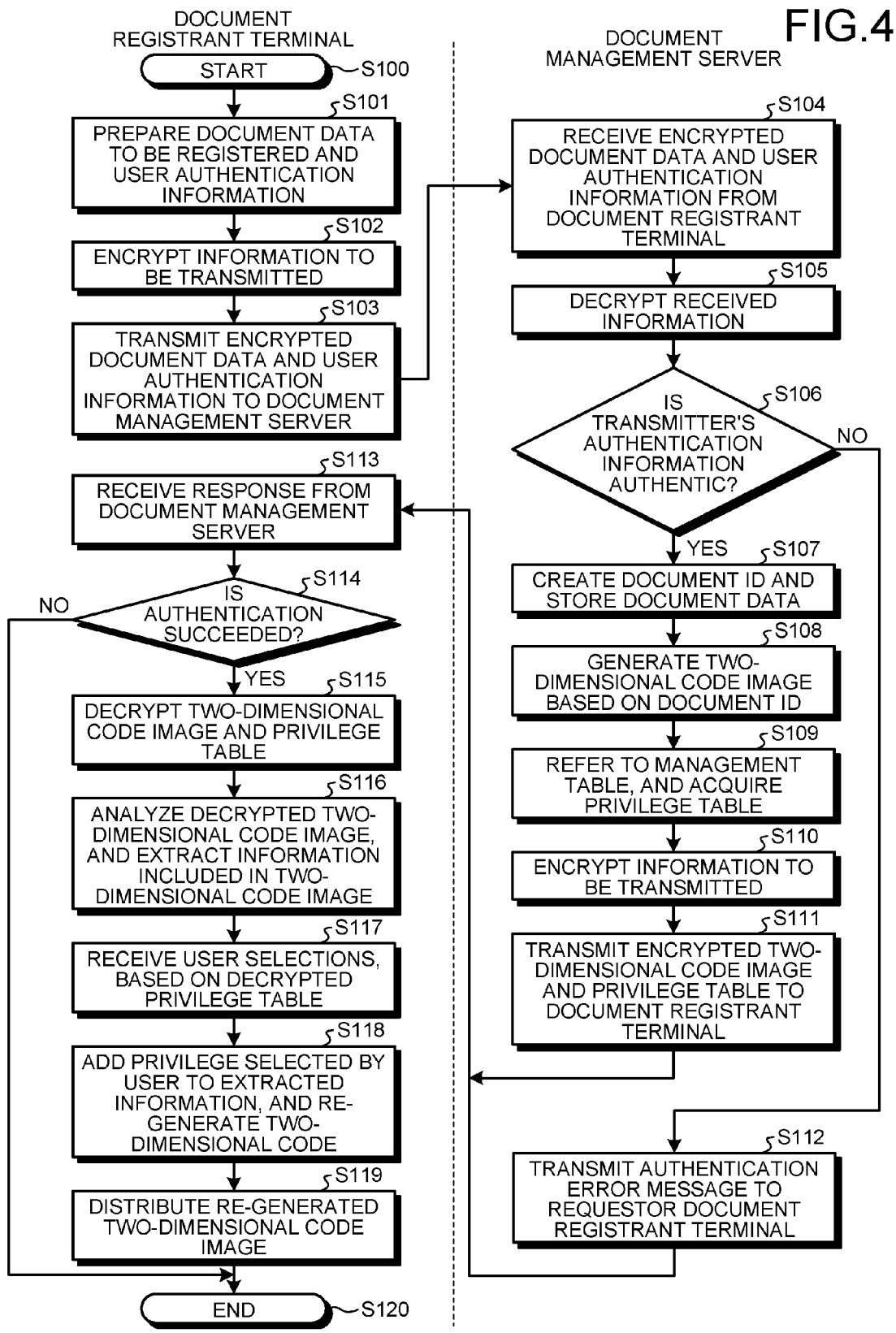
FIG. 4 is a flowchart illustrating the document data registration process performed between a document registrant terminal and a document management server in the embodiment.

FIG. 4 is a flowchart illustrating the document data registration process performed between the document registrant terminal 140 and the document management server 110 according to the embodiment. The process illustrated in FIG. 4 starts at Step S100. At Step S101, the document registrant terminal 140 prepares the document data to be registered and the user authentication information. The user authentication information herein is a piece of information for authenticating the user of the document registrant terminal 140. The user authentication information is explained herein as being provided to the user of the document registrant terminal 140 in advance, and configured to the client application on the document registrant terminal 140. The document data is prepared by importing a document file in the document registrant terminal 140 into the client application, as a piece of document data to be registered.

At Step S102, the document registrant terminal 140 encrypts the information to be transmitted (document data and user authentication information) using an encryption technique such as secure sockets layer (SSL). At Step S103, the document registrant terminal 140 transmits the encrypted document data and user authentication information, together with a registration request, to the document management server 110.

At Step S104, the document management server 110 receiving the registration request receives the encrypted document data and user authentication information, as well as the registration request, from the document registrant terminal 140. At Step S105, the document management server 110 decrypts the received information, acquiring the document data and the user authentication information thereby. At Step S106, the document management server 110 determines whether the user who is the transmitter of the request is a privileged user based on the decrypted user authentication information. At Step S106, if the document management server 110 determines that the user authentication information is authentic, and the user who is the transmitter is a privileged user (Yes), the process is shifted to Step S107.

At Step S107, the document management server 110 creates a document ID for the document data for which the registration is requested, and stores the document data in a manner mapped with the created document ID. At Step S108, the document management server 110 generates a two-dimensional code image based on the document ID.

FIG. 6 illustrates a data structure of a document management table managed in the document management server 110. In the example illustrated in FIG. 6, the document data for which the registration is requested is registered in the document management table in a manner mapped with a document ID, two-dimensional code information that is a digest value of the document ID, the location where the document data is stored, and a tenant ID that is used for the document data.

Referring back to FIG. 4, at Step S109, the document management server 110 refers to the management table, and acquires the privilege table for the tenant corresponding to the authenticated end user. At Step S110, the document management server 110 encrypts the generated two-dimensional code image and the privilege table. At Step S111, the document management server 110 transmits the encrypted two-dimensional code image and privilege table to the requestor document registrant terminal 140.

FIG. 7(A) illustrates a data structure of the privilege table managed in the document management server 110 according to the embodiment. As illustrated in FIG. 7(A), one privilege table is defined for each tenant, and includes one or more options for each of a plurality of privileging items. In the example illustrated in FIG. 7(A), the privileging item "Country with Privileged" has a plurality of options such as "Japan", "USA", and "UK". Each of the privileging items such as "Office with Privileged" and "Department" also has one or more options. The privilege table illustrated in FIG. 7(A) is defined in advance for the corresponding tenant, and the same privilege table is applied to the end users belonging to the same tenant.

The privileging items and their options illustrated in FIG. 7(A) are merely examples. In addition to the Country with Privileged, the Office with Privileged, and the Organization with Privileged indicating where the electronic information output devices granted with the privilege are installed, the privileging items may specify the model of such output devices with the privilege, the countries, the offices, and the organizations of users who have the privilege to use the output devices, and the responsibilities or the titles of such users. The privileging items may also specify the number of printouts permitted for one print request. The privilege table may include one or more options corresponding to at least one of the privileging items that are selected from such a group of privileging items.

Referring back to FIG. 4, at Step S106, if the document management server 110 determines that the user authentication information is not authentic (No), the process is branched to Step S112. At Step S112, the document management server 110 transmits an authentication error message to the requestor document registrant terminal 140.

At Step S113, the document registrant terminal 140 receives a response to the registration request from the document management server 110. At Step S114, the document registrant terminal 140 determines whether the authentication has succeeded, based on the response. At Step S114, if the document registrant terminal 140 determines that the authentication has succeeded (Yes), the process is shifted to Step S115.

At Step S115, the document registrant terminal 140 decrypts the two-dimensional code image and the privilege table. At Step S116, the document registrant terminal 140 analyzes the decrypted two-dimensional code image, and extracts information from the two-dimensional code image. At Step S117, the document registrant terminal 140 receives designation of users from the options of privileging items, based on the decrypted privilege table.

Figure 8:
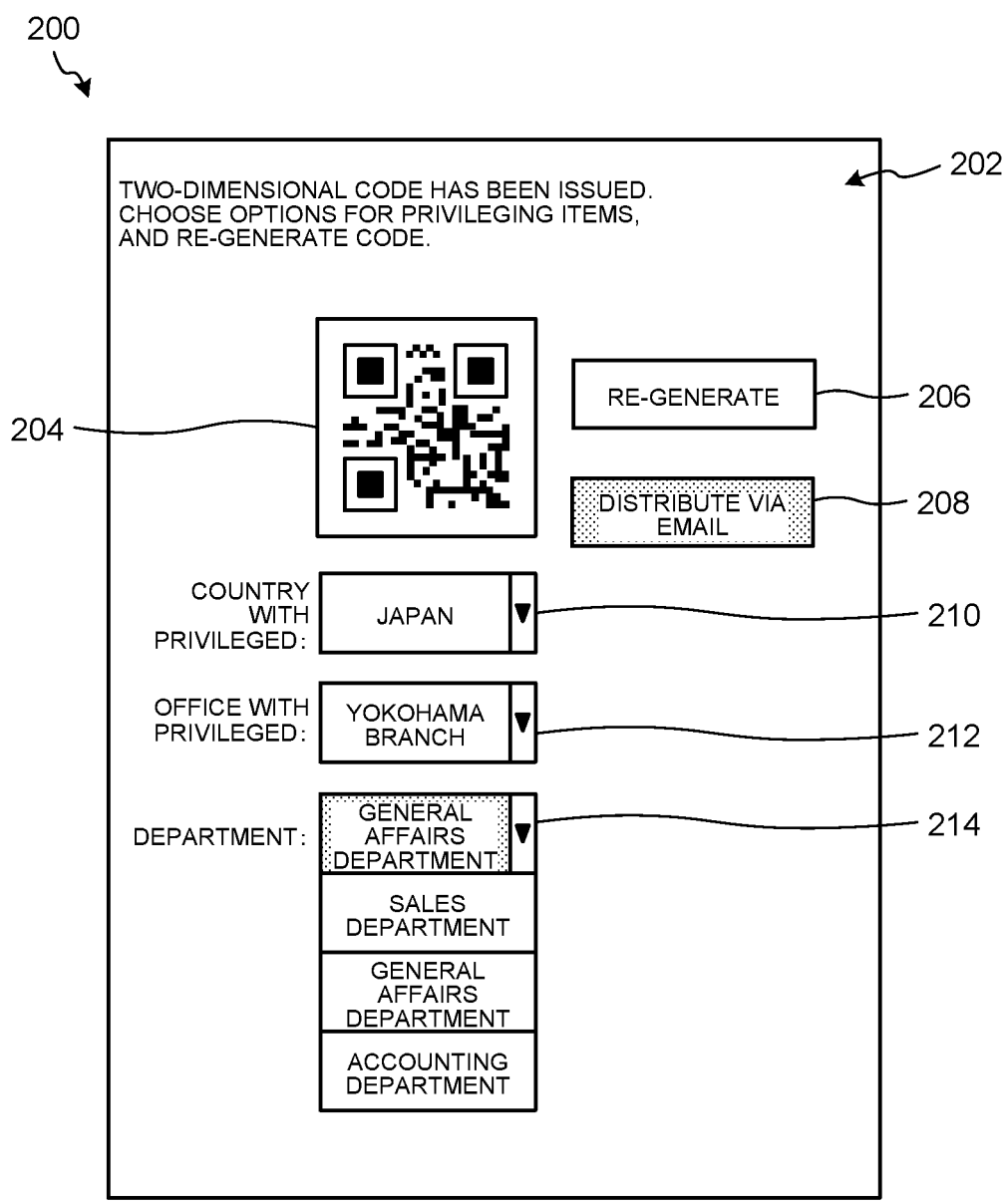
FIG. 8 is a schematic illustrating an exemplary user interface for re-generating a two-dimensional code image, displayed on the display of the document registrant terminal according to the embodiment.

FIG. 8 illustrates an exemplary user interface for re-generating a two-dimensional code image with some privileging items added to the issued two-dimensional code image, displayed on the display of the document registrant terminal 140. The two-dimensional code image regenerating screen 200 illustrated in FIG. 8 includes a message 202 notifying that the two-dimensional code image has been issued, and prompting a user to select privileging items, a display area 204 in which the issued two-dimensional code is displayed, a regenerate button 206 receiving a user instruction to regenerate the two-dimensional code image, a transmit email button 208 receiving an instruction to transmit the two-dimensional code image via an email. The two-dimensional code image regenerating screen 200 also includes pull-down menus 210, 212, and 214 for selecting options from the privileging items.

By selecting desired one or more options from each of the privileging items, in the pull-down menu 210, 212, and 214, the document registrant can define the scope of privilege for outputting the document data. When the document registrant taps on the regenerate button 206, at Step S118, the document registrant terminal 140 adds the options for the privileging items designated by the user to the decrypted information, and re-generates the two-dimensional code. FIG. 7(C) illustrates a data structure of the privilege information added in the document registrant terminal 140 according to the embodiment. As illustrated in FIG. 7(C), for each of the privileging items, an option is selected, defining the privilege to output the document data thereby. Although illustrated in FIG. 7(B) are options themselves of the respective privileging items, the options, information of which is shared between the document registrant terminal 140 and the document management server 110, may be embedded in the two-dimensional code as an identification number identifying the options, or digest values of the respective options.

Once the two-dimensional code image is re-generated, the display area 204 is updated, and the transmit email button 208 is enabled. Once the user taps on the transmit email button 208, selects the designated receivers from an address book or the like, and completes giving the instruction of transmitting the email, the process of distributing the two-dimensional code image takes place. At Step S119, the document registrant terminal 140 communicates with an email transmission server, and distributes the re-generated two-dimensional code image to be distributed to the designated receivers via an email, and the process is ended at Step S120. If the document registrant terminal 140 determines that the authentication has failed at Step S114 (No), the process is shifted directly to Step S120, and the process is ended.

Figure 5:
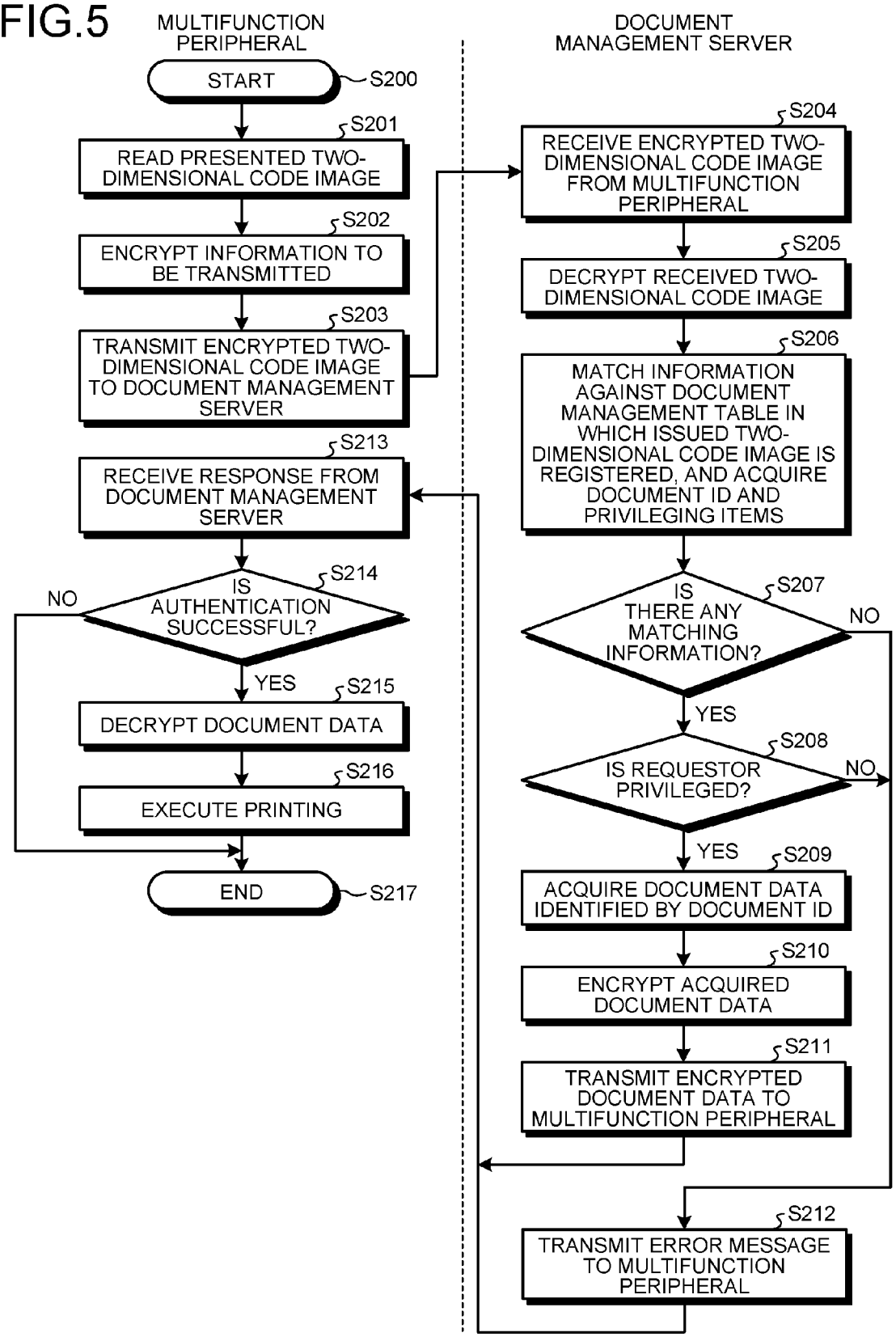
FIG. 5 is a flowchart illustrating the document data printout outputting process performed between a multifunction peripheral and the document management server in the embodiment.

FIG. 5 is a flowchart illustrating the document data printout outputting process performed between the multifunction peripheral 170 and the document management server 110 according to the embodiment. In the embodiment explained herein, it is assumed that the designated receiver has a privilege, as the end user belonging to the same tenant as the end user of the distributing document management server 110, and that the designated receiver has logged into the multifunction peripheral 170 and has been authenticated. The process illustrated in FIG. 5 starts at Step S200. At Step S201, the multifunction peripheral 170 causes the two-dimensional code reader 172 to read the two-dimensional code image presented to the multifunction peripheral 170. At Step S202, the multifunction peripheral 170 encrypts the information to be transmitted (presented two-dimensional code image), using an encryption technique such as the SSL. At Step S203, the multifunction peripheral 170 transmits the encrypted two-dimensional code image, as well as a request for document data, to the document management server 110. While explained herein is an example in which the two-dimensional code image is transmitted, in another embodiment, extracted information extracted from the two-dimensional code image may be transmitted, as mentioned earlier.

At Step S204, the document management server 110 receiving the request for the document data receives the encrypted two-dimensional code image, as well as the request for the document data, from the multifunction peripheral 170. At Step S205, the document management server 110 decrypts the received two-dimensional code image. At Step S206, the document management server 110 extracts information from the decrypted two-dimensional code image, collates the information with the document management table in which information related to the issued two-dimensional codes are registered (FIG. 6), and acquires the document ID and the privileging items as the extracted information.

At Step S207, the document management server 110 determines whether the received information matches any information in the document management table. If the document management table has some record that matches the document ID (or digest value of the document ID) extracted from the received two-dimensional code image, the document management server 110 determines that the two-dimensional code image from which the read two-dimensional code image has originated (including the privilege information, in some cases) has been issued, and that the document management table has matching information. At Step S207, if the document management server 110 determines that the document management table has a matching record (Yes), the process is branched to Step S208.

At Step S208, the document management server 110 then collates the privilege information acquired at Step S206 with the information managed by the document management server 110 to determine whether the multifunction peripheral 170 has the privilege. In the example explained herein, if the acquired privilege information includes any privileging item or option not defined in the privilege table for the corresponding tenant to which the end user belongs, the document management server 110 determines that the multifunction peripheral 170 does not have the privilege. The document management server 110 also determines that the multifunction peripheral 170 does not have the privilege if the device ID of the multifunction peripheral 170 that is the requestor for the document data is not registered in the device attribute table, or if the privilege information do not match the Country with Privileged, the Office with Privileged, the Department, and the like associated with the device ID. If the privilege information acquired at Step S206 is defined in the privilege table, and if the acquired privilege information matches the options designated in the privileging items such as the Country with Privileged, the Office with Privileged, and the Department to which the multifunction peripheral 170 that is the requestor of the document data belongs, the document management server 110 determines that the multifunction peripheral 170 has the privilege.

FIG. 7(B) illustrates a data structure of the device attribute table managed in the document management server 110 according to the embodiment. As illustrated in FIG. 7(B), one device attribute table is defined for each tenant, and specifies options for each of a plurality of privileging items for each device. In the example illustrated in FIG. 7(B), registered for a device "MFP 00001" are "Country with Privileged"="Japan", "Office with Privileged"="Yokohama Branch", and "Department"="Sales Department". The device attribute table illustrated in FIG. 7(B) is defined for the tenant in advance, and the same table is enforced on the end users belonging to the same tenant.

The privileging items and their corresponding options illustrated in FIG. 7(B) are merely examples. In addition to the Country with Privileged, the Office with Privileged, and the Organization with Privileged indicating where the electronic information output devices granted with the privilege are installed, the privileging items may specify the models of such output devices with the privilege, the countries, the offices, and the organizations of users who have the privilege to use the output devices, and the responsibilities or the titles of such users, in a manner corresponding to the privilege table illustrated in FIG. 7(A). A privileging item related to the number of printouts permitted for one print request may be enforced by providing the document management table illustrated in FIG. 6 with an additional column for counting the total number of outputs executed for a piece of document data, and by determining whether another output is permitted.

If the requestor is determined to have the privilege at Step S208 (Yes), the process is branched to Step S209. At Step S209, the document management server 110 retrieves the location where document data identified by the extracted document ID or the digest value is stored from the document management table, and acquires the document data from the storage location. At Step S210, the document management server 110 encrypts the acquired document data, and transmits the encrypted document data to the requestor multifunction peripheral 170 at Step S211. If the document management table has no matching information at Step S207, or if the requestor is determined not to have the privilege at Step S208 (No at S207 or No at S208), the process is branched to Step S212. At Step S212, the document management server 110 transmits an error message to the requestor multifunction peripheral 170.

At Step S213, the multifunction peripheral 170 receives a response to the request for the document data from the document management server 110. At Step S214, the multifunction peripheral 170 determines whether the document data has been received successfully, based on the response.

If the multifunction peripheral 170 determines that the document data has been received successfully at Step S214 (Yes), the process is shifted to Step S215.

At Step S215, the multifunction peripheral 170 decrypts the document data, and outputs the document data via the output unit 176 at Step S216, and the process is ended at Step S217. If the multifunction peripheral 170 determines that the receipt of the document data has failed at Step S214 (No), the process is directly branched to Step S217, and the process is ended.

In the configuration according to embodiment explained above, after the document registrant uploads a piece of document data to the document management server 110, the document management server 110 issues a two-dimensional code image. The document registrant then re-generates the two-dimensional code image by adding some privilege information for restricting apparatuses permitted to output the document data and the like to the issued two-dimensional code image, and distributes the two-dimensional code image. A user receiving the distribution allows a multifunction peripheral to read the two-dimensional code image embedded with the additional privilege information, and the multifunction peripheral transmits a request for the document data to the document management server 110. Only the output device found to have the privilege, as a result of the collation in the document management server 110, can receive the data to be printed.

Therefore, with the configuration described above, information for acquiring and outputting document data can be distributed in a manner only permitting the outputs within a limited scope of privilege. In this manner, document data can be shared without the concerns about leakage of user authentication information or electronic information itself. Just by allowing an appropriate multifunction peripheral to read the distributed two-dimensional code image, the designated receivers can obtain a printout of the document data that is associated with the received two-dimensional code image.

In the explanation of the embodiment above, an image forming apparatus such as a multifunction peripheral that outputs a printout of the document data is used as an example of the electronic information output device. The electronic information output device is, however, not particularly limited thereto, and the embodiment may be used in any apparatuses capable of outputting electronic information, including a video projector such as a projector that outputs a projection of video data, and an audio player that outputs audio data. Furthermore, in the explanation above, a mobile information terminal such as a smart phone is used as an example of the terminal device. However, any electronic information input device with an operation panel, including a multifunction peripheral itself, may be used as the terminal device, and may be configured to upload a piece of document data scanned on the electronic information input device, to receive the two-dimensional code image, and to enable the options of privileging items to be selected on the operation panel.

Furthermore, in the embodiment explained above, a two-dimensional code image is used as an example of an information-embedded pattern in which information is embedded in a predefined format. To embed information in an information-embedded pattern, however, means to include information in a chronological or spatial pattern in some kind of medium, in a format not allowing humans to directly recognize the information, and the information-embedded pattern may be any pattern that can be detected by a sensor provided to the electronic information output device, with no particular limitation. The information-embedded pattern may be, without limitation to the two-dimensional code image, a one-dimensional pattern image, an ON/OFF pattern of light-emitting elements, a vibration pattern of a vibrator, or an audio pattern of an audio generator (e.g., ultrasonic waves), for example.

As explained above, according to the embodiment, it is possible to provide an information processing system, a management device, an information output method, and a computer program capable of distributing information for acquiring and outputting an electronic document that is to be distributed, in a manner permitting outputs of the an electronic document within a limited scope of privilege.

FIG. 9 is a block diagram illustrating an exemplary hardware configuration of the document management server 110 according to the embodiment. As illustrated in FIG. 9, the document management server 110 includes a communicating unit 120, an operation unit 121, a display unit 122, a storage unit 123, and a controlling unit 124.

The communicating unit 120 communicates with an external device such as a terminal device via the network 102, and can be implemented as a communication device such as a network interface card (NIC).

The operation unit 121 receives various operation inputs, and can be implemented as an input device such as a keyboard, a mouse, a touch pad, and a touch panel.

The display unit 122 displays various screens, and can be implemented as a display device such as a liquid crystal display or a touch panel display.

The storage unit 123 stores therein various server computer programs executed on the document management server 110, such as a document management program, and data used in various processes executed in the document management server 110. The storage unit 123 can be implemented as a storage device capable of storing the computer programs and data magnetically, optically, or electrically, such as an HDD, an SSD, a memory card, an optical disc, a ROM, and a RAM. The storage unit 123 includes the document storage unit 125.

The controlling unit 124 controls the units in the document management server 110, and can be implemented as a control device such as a CPU.

The designated receiver terminal 190 is what is called a smart device with a touch panel, and is an information processing apparatus that communicates with the document management server 110 wirelessly via a wireless station. The touch panel is configured as a touch detector mounted on the display device such as a liquid crystal display or integrated with the display device, and enables information to be input by displaying various button images on the display device, instead of regular mechanical buttons.

FIG. 10 is a schematic illustrating an exemplary hardware configuration of the designated receiver terminal 190 according to the embodiment. As illustrated in FIG. 10, the designated receiver terminal 190 includes a CPU 151, a ROM 152, a RAM 153, an operation unit 154, a display 155, a wireless communicating unit 156, an auxiliary storage device 157, and a camera unit 158 that are connected via a bus 159.

The CPU 151 is a processor that controls the entire operation of the information terminal. The ROM 152 is a non-volatile storage device storing therein computer programs, control data, and the like for the information terminal. The RAM 153 is a volatile storage device used as a working area of the CPU 151.

The operation unit 154 is an input device for, for example, selecting characters, numbers, and various instructions. The display 155 is a display device for displaying various types of information such as menus, windows, characters, and images. The operation unit 154 and the display 155 are devices corresponding to the touch panel described above.

The wireless communicating unit 156 is a wireless interface for communicating wirelessly with wireless base stations and external output devices. The wireless communicating unit 156 complies with wireless communication standards such as Wireless Fidelity (Wi-Fi) (registered trademark) and Bluetooth (registered trademark).

The auxiliary storage device 157 is a non-volatile storage device such as an HDD or an SSD storing therein various types of information including a computer program. The camera unit 158 has a function for capturing an image of a subject such as a barcode.

FIG. 11 is a block diagram illustrating a hardware configuration of the multifunction peripheral 170 according to the embodiment. As illustrated in this diagram, this multifunction peripheral 170 includes a controller 10 and an engine 60 that are connected over a peripheral component interface (PCI) bus. The controller 10 is a controller that controls the entire multifunction peripheral 170, drawing, communications, and inputs from an operation unit not illustrated. The engine 60 is a printer engine, for example, that is connectable to a PCI bus, and is a monochromatic plotter, a single-drum color plotter, a four-drum color plotter, a scanner, or facsimile unit, for example. The engine 60 also includes an image processing unit performing error diffusion, and gamma transformation, in addition to what is called an engine such as a plotter. The two-dimensional code reader 172 is a device for optically reading a two-dimensional code such as the QR code (registered trademark) described above.

The controller 10 includes a CPU 11, a north bridge (NB) 13, a system memory (MEM-P) 12, a south bridge (SB) 14, a local memory (MEM-C) 17, an application specific integrated circuit (ASIC) 16, and an HDD 18. The NB 13 and the ASIC 16 are connected over an accelerated graphics port (AGP) bus 15. The MEM-P 12 includes a ROM 12a and a RAM 12b.

The CPU 11 controls the entire multifunction peripheral 170. The CPU 11 has a chipset including the NB 13, the MEM-P 12, and the SB 14, and is connected to other devices via the chipset.

The NB 13 is a bridge for connecting the CPU 11 to the MEM-P 12, the SB 14, and the AGP 15. The NB 13 includes a memory controller that controls writing, reading, or the like in the MEM-P 12, and a PCI master, and an AGP target.

The MEM-P 12 is a system memory used as a memory for storing computer programs and data, a memory for loading the computer programs and the data, and a memory for performing drawing for the printer, and includes the ROM 12a and the RAM 12b. The ROM 12a is a read-only memory used as a memory for storing computer programs and data, and the RAM 12b is a writable and readable memory used as a memory for loading computer programs and data, and as a memory for performing drawing for the printer.

The SB 14 is a bridge for connecting the NB 13 to PCI devices and peripheral devices. The SB 14 is connected to the NB 13 via a PCI bus to which a network interface (I/F) unit and the like are also connected.

The ASIC 16 is an integrated circuit (IC) for image processing applications, with a hardware element for image processing, and serves as a bridge for connecting the AGP 15, the PCI bus, the HDD 18, and the MEM-C 17 to one another. The ASIC 16 includes a PCI target and an AGP master, an arbiter (ARB) that is the core of the ASIC 16, a memory controller that controls the MEM-C 17, a plurality of direct memory access controllers (DMACs) that performs operations such as rotations of image data using a hardware logic or the like, and a PCI unit that exchanges data with the engine 60 over the PCI bus. To the ASIC 16, a facsimile control unit (FCU) 30, a universal serial bus (USB) 40, an Institute of Electrical and Electronics Engineers 1394 (IEEE 1394) interface 50 are connected, via the PCI bus. An operation display unit 20 is connected directly to the ASIC 16.

The MEM-C 17 is a local memory used as an image buffer for the copier, and also used as an encoding buffer. The HDD 18 is a storage in which image data, computer programs, font data, and forms are accumulated.

The AGP 15 is a bus interface for a graphics accelerator card that is developed to speed up processing of graphics, and accelerates the graphics accelerator card by accessing the MEM-P 12 at a high throughput.

The functional units described above may be implemented as a computer-executable program described in, for example, a legacy programming language such as an assembler, C, C++, C#, or Java (registered trademark), or an object-oriented programming language. The functional units may be stored in a device-readable recording medium such as a ROM, an electrically erasable programmable read-only memory (EEPROM), an erasable programmable read-only memory (EPROM), a flash memory, a flexible disk, compact disc read-only memory (CD-ROM), a compact disc rewritable (CD-RW), a digital versatile disc read-only memory (DVD-ROM), a digital versatile disc random access memory (DVD-RAM), a digital versatile disc rewritable (DVD-RW), a Blu-ray disc, a SD card (registered trademark), a magneto-optical (MO) disk, or distributed over an electronic communication circuit.

According to the embodiment as described above, it is possible to distribute information for acquiring and outputting an electronic document to be distributed, in a manner allowing the electronic document to be output within a limited scope of privilege, advantageously.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An information processing system comprising:
a management device; a terminal device; and
an electronic information output device, wherein
the management device includes
a storage unit configured to store electronic information for which registration is requested as electronic information to be distributed, the registration being requested by the terminal device, in association with identification information for identifying the electronic information;
an issuing unit configured to issue an information-embedded pattern embedded with the identification information in a predefined format to the terminal device;
a determining unit configured to determine whether the electronic information output device has privilege to output the electronic information, based on management information managed by the management device and information received from the electronic information output device requesting for the electronic information; and a transmitting unit configured to transmit the electronic information identified by the received information to the electronic information output device when the determining unit determines that the electronic information output device has the privilege, the terminal device includes a re-generating unit configured to re-generate an information-embedded pattern to be distributed by adding privilege information to information included in the information-embedded pattern issued by the management device, the privilege information being chosen from candidates for privilege for defining a scope of the privilege to output the electronic information, the candidates for privilege being shared between the terminal device and the management device, and the electronic information output device includes a reader configured to read a presented information-embedded pattern; and a transmitting unit configured to transmit the information-embedded pattern read by the reader to the management device in response to a request for the electronic information.

2. The information processing system according to claim 1, wherein the candidates for privilege are defined for each user.

3. The information processing system according to claim 1, wherein communication between the management device and the terminal device is encrypted.

4. The information processing system according to claim 1, wherein the determining unit is configured to determine whether the management device has issued the information-embedded pattern having been read by the electronic information output device, and collate privilege information included in the information-embedded pattern having been read by the electronic information output device with attribute information of the electronic information output device managed by the management device.

5. The information processing system according to claim 1, wherein the terminal device includes a display unit configured to display the candidates for privilege, and a receiving unit configured to receive a user designation of privilege to be enforced on the electronic information for which registration is requested, the user designation being made from the candidates for privilege displayed on the display unit.

6. The information processing system according to claim 1, wherein the management device transmits the candidates for privilege managed by the management device to the terminal device when the management device issues the information-embedded pattern to the terminal device.

7. The information processing system according to claim 1, wherein each of the candidates for privilege has one or more options corresponding to at least one privileging item selected from the group consisting of a country in which the privileged electronic information output device is located, an office in which the privileged electronic information output device is located, and an organization with the privileged electronic information output device, and a model of the privileged electronic information output device is located, a country of a user, an office to which the user using the electronic information output device belongs, and an organization to which the user using the electronic information output device belongs, a responsibility of the user, a title of the user, and the number of printouts permitted for one print request.

8. The information processing system according to claim 1, wherein the information-embedded pattern is a pattern detectable by a sensor included in the electronic information output device.

9. The information processing system according to claim 1, wherein the information-embedded pattern includes at least one of a one-dimensional code, a two-dimensional code, an ON/OFF pattern, a vibration pattern, and an audio pattern.

10. A management device for managing electronic information and processing a request for the electronic information requested by an electronic information output device, the management device comprising:

a storage unit configured to store electronic information for which registration is requested as electronic information to be distributed by a terminal device, in association with identification information for identifying the electronic information;

an issuing unit configured to issue an information-embedded pattern embedded with the identification information in a predefined format to the terminal device;

a managing unit configured to manage candidates for privilege for defining a scope of the privilege for outputting, the candidates for privilege being shared between the management device and the terminal device and allowing the terminal device to make choice;

a receiving unit configured to receive, from the electronic information output device requesting for the electronic information, information in the information-embedded pattern presented to the electronic information output device;

a first determining unit configured to determine whether the issuing unit has issued the information-embedded pattern presented to the electronic information output device;

a second determining unit configured to determine whether the electronic information output device has privilege to output the electronic information, based on management information managed by the management device and privilege information extracted from the information-embedded pattern presented to the electronic information output device requesting for the electronic information; and a transmitting unit configured to transmit the electronic information identified by the identification information extracted from the information-embedded pattern presented to the electronic information output device to the electronic information output device when the first determining unit determines that the issuing unit has issued the information-embedded pattern and the second determining unit determines that the electronic information output device has the privilege, wherein the information-embedded pattern presented to the electronic information output device is an information-embedded pattern to be distributed that is re-generated by adding privilege information chosen from the candidates for privilege by the terminal device to the information included in the information-embedded pattern issued by the issuing unit.

11. An information output method implemented among a management device, a terminal device, and an electronic information output device, the information output method comprising:

requesting, by the terminal device, the management device to register electronic information to be distributed;

storing, by the management device, the electronic information for which registration is requested, in association with identification information for identifying the electronic information;

issuing, by the management device, an information-embedded pattern embedded with the identification information in a predefined format to the terminal device;

re-generating, by the terminal device, an information-embedded pattern to be distributed by adding privilege information to information included in the information-embedded pattern issued by the management device, the privilege information being chosen from candidates for privilege for defining a scope of the privilege to output the electronic information, the candidates for privilege being shared between the terminal device and the management device;

transmitting, by the electronic information output device, information in a presented information-embedded pattern to the management device in response to a request for the electronic information;

determining, by the management device, whether the electronic information output device has privilege to output the electronic information, based on management information managed by the management device and privilege information extracted from the information-embedded pattern presented to the electronic information output device; and transmitting, by the management device, the electronic information identified by the identification information extracted from the information-embedded pattern presented to the electronic information output device, to the electronic information output device when the management device determines that the electronic information output device has the privilege.

12. The information output method according to claim 11, further comprising:

determining, by the management device, whether the management device has issued the information-embedded pattern presented to the electronic information output device; and collating, by the management device, privilege information included in the information-embedded pattern presented to the electronic information output device with attribute information of the electronic information output device managed by the management device.

13. The information output method according to claim 11, further comprising:

displaying, by the terminal device, the candidates for privilege; and receiving, by the terminal device, a user designation of privilege to be enforced on the electronic information for which registration is requested, the user designation being made from the displayed candidates for privilege.

14. The information output method according to claim 11, further comprising transmitting, by the management device, the candidates for privilege managed by the management device to the terminal device when the management device issues the information-embedded pattern to the terminal device.

* * * * *